(12) United States Patent
Han et al.

(10) Patent No.: US 7,307,807 B1
(45) Date of Patent: Dec. 11, 2007

(54) DISK SERVO PATTERN WRITING

(75) Inventors: Ke Han, Fremont, CA (US); Pantas Sutardja, Los Gatos, CA (US); Rui Cao, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 636 days.

(21) Appl. No.: 10/799,474

(22) Filed: Mar. 11, 2004

Related U.S. Application Data

(60) Provisional application No. 60/505,947, filed on Sep. 24, 2003, provisional application No. 60/505,416, filed on Sep. 23, 2003.

(51) Int. Cl.
  *G11B 21/02* (2006.01)
  *G11B 5/596* (2006.01)
  *G11B 20/06* (2006.01)

(52) U.S. Cl. .................. 360/75; 360/77.08; 360/39

(58) Field of Classification Search .............. None
  See application file for complete search history.

(56) References Cited

U.S. PATENT DOCUMENTS

| | | | |
|---|---|---|---|
| 5,089,917 A * | 2/1992 | Kanota et al. ............ 360/45 |
| 5,448,429 A | 9/1995 | Cribbs et al. | |
| 5,541,784 A | 7/1996 | Cribbs et al. | |
| 5,612,833 A | 3/1997 | Yarmchuk et al. | |
| 5,668,679 A * | 9/1997 | Swearingen et al. ........ 360/75 |
| 5,907,447 A | 5/1999 | Yarmchuk et al. | |
| 6,040,955 A | 3/2000 | Brown et al. | |
| 6,169,429 B1 * | 1/2001 | Kiriaki ................... 327/104 |
| 6,304,407 B1 | 10/2001 | Baker et al. | |
| 6,504,882 B1 | 1/2003 | Kim | |
| 6,507,450 B1 | 1/2003 | Elliott | |
| 6,603,722 B1 | 8/2003 | Taguchi et al. | |
| 6,704,156 B1 | 3/2004 | Baker et al. | |
| 6,738,205 B1 * | 5/2004 | Moran et al. ............. 360/17 |
| 6,977,789 B1 * | 12/2005 | Cloke ..................... 360/75 |

OTHER PUBLICATIONS

Edward A. Lee et al., "Digital Communication", Second Edition, Kluwer Academic Publishers.

* cited by examiner

*Primary Examiner*—K. Wong

(57) ABSTRACT

Systems and techniques to write servo patterns on machine-readable media. In general, in one implementation, the technique includes: obtaining timing information from a spiral servo reference track on a machine-readable medium to determine head position, and generating a servo track with servo information based on the determined head position. Obtaining the timing information can involve determining a peak position of a diamond-shaped waveform and identifying occurrences of a timing-reference symbol in the spiral servo reference track. Moreover, identifying occurrences of the timing-reference symbol can involve decoding an encoded repeating pattern using multiple framings, correlating signal samples that indicate pattern transitions with valid pattern transitions as defined by the encoding, accumulating the transition pattern correlations for the multiple framings, selecting one of the multiple framings as a correct framing, and determining a waveform polarity for the signal.

46 Claims, 11 Drawing Sheets

FIG. 9
900
| Previous Symbol | Current Symbol | State Transitions | Output Peaks | Outputs for Each Input Symbol | |
|---|---|---|---|---|---|
| | | | | Peak sampling | Shoulder sampling |
| "0"(1100) | "0"(1100) | 1100->1100 | X0-0\|+0-0 | 1,0,-1,0 | 1,1,-1,-1 |
| "0"(1100) | "1"(0011) | 1100->0011 | X0-0\|00+0 | 0,0,1,0 | 0,0,1,1 |
| "1"(0011) | "0"(1100) | 0011->1100 | X0+0\|00-0 | 0,0,-1,0 | 0,0,-1,-1 |
| "1"(0011) | "1"(0011) | 0011->0011 | X0+0\|-0+0 | -1,0,1,0 | -1,-1,1,1 |
FIG. 10
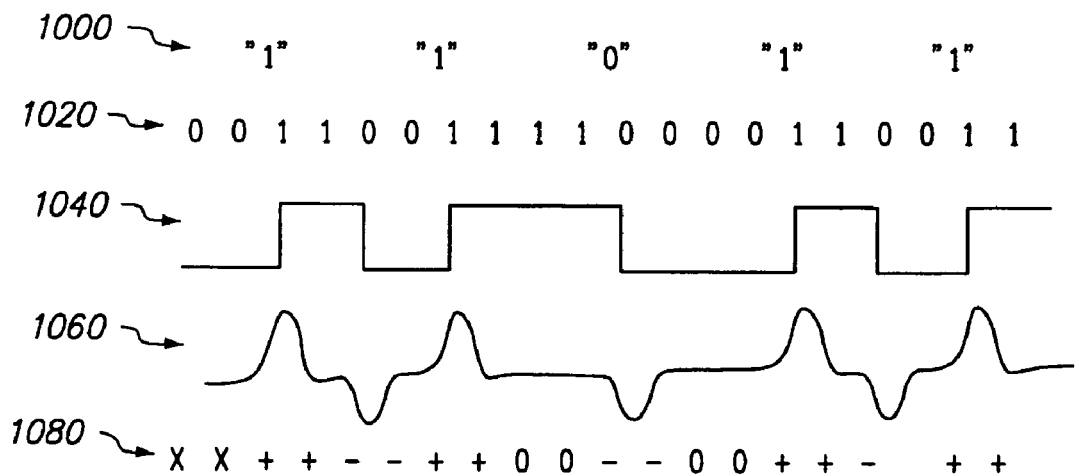
FIG. 11
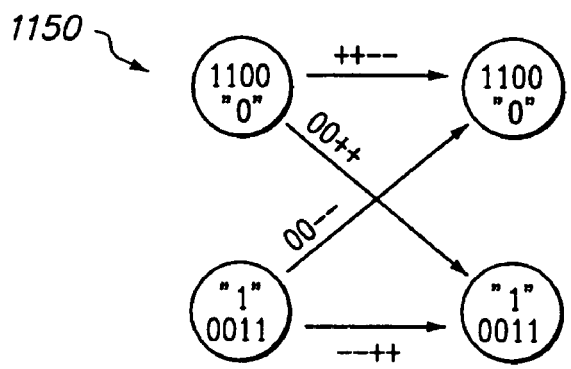

| Phase 0 | | Phase 1 | | Phase 2 | | Phase 3 | |
|---|---|---|---|---|---|---|---|
| output | accumulator | output | accumulator | output | accumulator | output | accumulator |
| 0 | 672 | 1 | 1036 | 1 | 2074 | 1 | 1215 |
| 0 | 672 | 1 | 1036 | 1 | 2074 | 0 | 1215 |
| 0 | 672 | 0 | 1036 | 1 | 2074 | 1 | 1215 |
| 0 | 672 | 1 | 1036 | 1 | 2074 | 0 | 1215 |
| 0 | 672 | 1 | 1036 | 1 | 2074 | 0 | 1216 |
| 0 | 672 | 1 | 1036 | 1 | 2075 | 0 | 1216 |
| 1 | 672 | 1 | 1037 | 1 | 2076 | 1 | 1216 |
| 1 | 673 | 0 | 1037 | 0 | 2076 | 0 | 1216 |
| 0 | 673 | 1 | 1037 | 1 | 2076 | 0 | 1216 |
| 0 | 673 | 1 | 1037 | 1 | 2076 | 0 | 1216 |
| 0 | 673 | 1 | 1037 | 1 | 2076 | 0 | 1216 |
| 0 | 673 | 1 | 1037 | 1 | 2076 | 0 | 1216 |
| 0 | 673 | 1 | 1037 | 1 | 2076 | 1 | 1216 |
| 0 | 673 | 0 | 1037 | 1 | 2077 | 1 | 1217 |
| 0 | 673 | 0 | 1037 | 1 | 2078 | 1 | 1217 |
| 0 | 673 | 0 | 1037 | 0 | 2078 | 0 | 1218 |
| 0 | 673 | 1 | 1037 | 1 | 2078 | 1 | 1218 |
| 0 | 673 | 1 | 1037 | 1 | 2078 | 0 | 1218 |
| 0 | 673 | 1 | 1037 | 1 | 2078 | 0 | 1218 |
| 0 | 673 | 1 | 1037 | 1 | 2078 | 1 | 1218 |
| 0 | 673 | 0 | 1037 | 1 | 2078 | 1 | 1218 |
| 1 | 674 | 0 | 1037 | 1 | 2079 | 1 | 1218 |
| 1 | 674 | 0 | 1038 | 1 | 2080 | 1 | 1218 |
| 0 | 675 | 0 | 1038 | 0 | 2080 | 0 | 1218 |
| 0 | 675 | 1 | 1038 | 1 | 2080 | 0 | 1218 |
| 0 | 675 | 0 | 1038 | 1 | 2080 | 1 | 1218 |
| 0 | 675 | 0 | 1038 | 1 | 2080 | 0 | 1218 |
| 0 | 675 | 1 | 1038 | 1 | 2080 | 0 | 1218 |
| 0 | 675 | 1 | 1038 | 1 | 2080 | 0 | 1219 |
| 1 | 675 | 1 | 1039 | 1 | 2081 | 0 | 1219 |
| 1 | 675 | 1 | 1039 | 1 | 2082 | 1 | 1219 |
| 0 | 676 | 0 | 1039 | 0 | 2082 | 0 | 1219 |
| 0 | 676 | 1 | 1039 | 1 | 2082 | 0 | 1219 |
| 0 | 676 | 1 | 1039 | 1 | 2082 | 0 | 1219 |
| 0 | 676 | 1 | 1039 | 1 | 2082 | 1 | 1219 |
| 0 | 676 | 1 | 1039 | 1 | 2082 | 0 | 1219 |
| 0 | 676 | 1 | 1039 | 1 | 2082 | 1 | 1219 |
| 0 | 676 | 0 | 1039 | 1 | 2083 | 1 | 1219 |
| 0 | 676 | 0 | 1040 | 1 | 2085 | 1 | 1219 |

| Phase 0 | | Phase 1 | | Phase 2 | | Phase 3 | |
|---|---|---|---|---|---|---|---|
| output | accumulator | output | accumulator | output | accumulator | output | accumulator |
| 1 | 672 | 0 | 1036 | 0 | 2074 | 0 | 1215 |
| 1 | 672 | 0 | 1036 | 0 | 2074 | 1 | 1215 |
| 1 | 672 | 1 | 1036 | 0 | 2074 | 0 | 1251 |
| 1 | 672 | 0 | 1036 | 0 | 2074 | 1 | 1251 |
| 1 | 672 | 0 | 1036 | 0 | 2074 | 1 | 1216 |
| 1 | 672 | 0 | 1036 | 0 | 2075 | 1 | 1216 |
| 1 | 672 | 0 | 1037 | 0 | 2076 | 0 | 1216 |
| 0 | 673 | 1 | 1037 | 1 | 2076 | 1 | 1216 |
| 0 | 673 | 0 | 1037 | 0 | 2076 | 1 | 1216 |
| 1 | 673 | 0 | 1037 | 0 | 2076 | 1 | 1216 |
| 1 | 673 | 0 | 1037 | 0 | 2076 | 1 | 1216 |
| 1 | 673 | 0 | 1037 | 0 | 2076 | 1 | 1216 |
| 1 | 673 | 0 | 1037 | 0 | 2076 | 0 | 1216 |
| 1 | 673 | 1 | 1037 | 0 | 2077 | 0 | 1217 |
| 1 | 673 | 1 | 1037 | 0 | 2078 | 0 | 1217 |
| 1 | 673 | 1 | 1037 | 1 | 2078 | 1 | 1218 |
| 1 | 673 | 0 | 1037 | 0 | 2078 | 0 | 1218 |
| 1 | 673 | 0 | 1037 | 0 | 2078 | 1 | 1218 |
| 1 | 673 | 0 | 1037 | 0 | 2078 | 1 | 1218 |
| 1 | 673 | 0 | 1037 | 0 | 2078 | 0 | 1218 |
| 1 | 673 | 1 | 1037 | 0 | 2078 | 0 | 1218 |
| 1 | 674 | 1 | 1037 | 0 | 2079 | 0 | 1218 |
| 1 | 674 | 1 | 1038 | 0 | 2080 | 0 | 1218 |
| 0 | 675 | 1 | 1038 | 1 | 2080 | 1 | 1218 |
| 0 | 675 | 0 | 1038 | 0 | 2080 | 1 | 1218 |
| 1 | 675 | 1 | 1038 | 0 | 2080 | 0 | 1218 |
| 1 | 675 | 1 | 1038 | 0 | 2080 | 1 | 1218 |
| 1 | 675 | 0 | 1038 | 0 | 2080 | 1 | 1218 |
| 1 | 675 | 0 | 1038 | 0 | 2080 | 1 | 1219 |
| 1 | 675 | 0 | 1039 | 0 | 2081 | 1 | 1219 |
| 1 | 675 | 0 | 1039 | 0 | 2082 | 0 | 1219 |
| 0 | 676 | 1 | 1039 | 1 | 2082 | 1 | 1219 |
| 0 | 676 | 0 | 1039 | 0 | 2082 | 1 | 1219 |
| 1 | 676 | 0 | 1039 | 0 | 2082 | 1 | 1219 |
| 1 | 676 | 0 | 1039 | 0 | 2082 | 0 | 1219 |
| 1 | 676 | 0 | 1039 | 0 | 2082 | 1 | 1219 |
| 1 | 676 | 0 | 1039 | 0 | 2082 | 0 | 1219 |
| 1 | 676 | 1 | 1039 | 0 | 2083 | 0 | 1219 |
| 1 | 676 | 1 | 1040 | 0 | 2085 | 0 | 1219 |
| 1 | 676 | 1 | 1040 | 1 | 2085 | 1 | 1219 |

| | 64 sampling phases that cover a complete symbol duration with 16x over-sampling |
|---|---|
| 1 | |
| 2 | |
| 3 | |
| 4 | |
| 5 | |
| 6 | |
| 7 | |
| 8 | |
| 9 | |
| 10 | |
| 11 | |
| 12 | |
| 13 | |
| 14 | |
| 15 | |
| 16 | |
| 17 | |
| 18 | |
| 19 | |
| 20 | |
| 21 | |
| 22 | |
| 23 | |
| 24 | _____xxxx_____ |
| 25 | _____xx |
| 26 | xxx_____xxxxxx_____ |
| 27 | _____xxx |
| 28 | xxxx_____xxxxxxx_____ |
| 29 | _____xxxxx_____xx__ |
| 30 | __xx_____xxxxxxxxx_____ |
| 31 | _____xxxxxx_____xx__ |
| 32 | __x_____xxxxxxxxxx_____ |
| 33 | _____xxxxxxxx_____xx__ |
| 34 | ___x_____xxxxxxxxxxx_____ |
| 35 | _____xxxxxxxxxxx_____x___ |
| 36 | _____xxxxxxxxxxx_____ |
| 37 | ___x_____xxxxxxxxxxx_____ |
| 38 | _____xxxxxxxxxxxxxxxxxxxxxxxxx_____xxxxxx |
| 39 | xxxx_____ |
| 40 | _xxxxxx_____xxxxxxxxxxxxxxxxxxxxxxxxxx_____x____ |
| 41 | _____xxxxxxxxxxx_____ |
| 42 | _____x_____xxxxxxxxxxxxxxxxxxxxxxxxxx_____ |
| 43 | _____xxxxxxxxxxxxx_____ |

FIG. 14-2

```
44  _____x_____xxxxxxxxxxxxxxxxxxxxxxxxx_____x_____
45  _____xxxxxxxxxxxxxx_____
46  _____x_____xxxxxxxxxxxxxxxxxxxxxxxxx_____x_____
47  _____xxxxxxxxxxxxxx_____
48  _____x_____xxxxxxxxxxxxxxxxxxxxxxxxx_____x_____
49  _____xxxxxxxxxxxxxx_____
50  _____x_____xxxxxxxxxxxxxxxxxxxxxxxxx_____x_____
51  _____xxxxxxxxxxxxxx_____
52  _____x_____xxxxxxxxxxxxxxxxxxxxxxxxx_____x_____
53  _____xxxxxxxxxxxxxx_____
54  _____x_____xxxxxxxxxxxxxxxxxxxxxxxxx_____x_____
55  _____xxxxxxxxxxxxxx_____
56  _____xxxxxxxxxxxxxxxxxxxxxxxxx_____x_____
57  _____xxxxxxxxxxxxxxxx_____
58  _____x_____xxxxxxxxxxxxxxxxxxxxxxxxx_____x_____
59  _____xxxxxxxxxxxxxx_____
60  _____x_____xxxxxxxxxxxxxxxxxxxxxxxxx_____x_____
61  _____xxxxxxxxxxxxxx_____
62  _____x_____xxxxxxxxxxxxxxxxxxxxxxxxx_____xx_____
63  _____xxxxxxxxxxxxxx_____
64  _____xxxxxxxxxxxxxxxxxxxxxxxxx_____x_____
65  _____xxxxxxxxxxxxxx_____
66  _____xxxxxxxxxxxxxxxxxxxxxxxxxxxxxx_____
67  _____xxxxxxxxxxxxxxxx_____
68  _____xxxxxxxxxxxxxxxxxxxxxxxxxxxxxxxxxxxxxxxxxxxxxxxxxxxxx
69  xxx_____
70  xxxxxxxxxxxxxxxxxxxxxxxxxxxxxxxxxxxxxxxxxxxxxxxxx_____
71  _____xxxxxxxxxxxxxxxx_____
72  _____xxxxx_xxxxxxxxxxxxxxxxxxxxxxxxxxxxxxxx_____
```

| | 64 sampling phases that cover a complete symbol duration with 16x over-sampling |
|---|---|
| 1 | |
| 2 | |
| 3 | |
| 4 | x_____xxxxxxxxxxxxxxxxxxxxxxxxxxxxxxxx_____ |
| 5 | _____xxxxxxxxxxxxxxxxxxxxxxxxxxxxxxxx_____ |
| 6 | _____xxxxxxxxxxxxxxxxxxxxxxxxxxxxxxxx_____ |
| 7 | _____xxxxxxxxxxxxxxxxxxxxxxxxxxxxxxxx_____x__ |
| 8 | ___x_xxxx_xxxxxxxxxxxxxxxxxxxxxxxxxxxxxxxxxxxxxxxxxxxxxxxxxxxx |
| 9 | xxxxxxxxxxxxxxxxxxxxxxxxxxxxxxxxxxxxxxxxxxxxxxxxxxxxx_____ |
| 10 | _____xxxxxxxxxxxxxxxxxxxxxxxxxxxxxxxx_____ |
| 11 | _____xxxxxxxxxxxxxxxxxxxxxxxxxxxxxxxx_____ |
| 12 | _____xxxxxxxxxxxxxxxxxxxxxxxxxxxxxxxx_____ |
| 13 | _____xxxxxxxxxxxxxxxxxxxxxxxxxxxxxxxx_____ |
| 14 | _____xxxxxxxxxxxxxxxxxxxxxxxxxxxxxxxx_____ |
| 15 | _____xxxxxxxxxxxxxxxxxxxxxxxxxxxxxxxx_____ |
| 16 | _____xxxxxxxxxxxxxxxxxxxxxxxxxxxxxxxx_____ |
| 17 | _____xxxxxxxxxxxxxxxxxxxxxxxxxxxxxxxx_____ |
| 18 | _____xxxxxxxxxxxxxxxxxxxxxxxxxxxxxxxx_____ |
| 19 | _____xxxxxxxxxxxxxxxxxxxxxxxxxxxxxxxx_____ |
| 20 | _____xxxxxxxxxxxxxxxxxxxxxxxxxxxxxxxx_____ |
| 21 | _____xxxxxxxxxxxxxxxxxxxxxxxxxxxxxxxx_____ |
| 22 | _____xxxxxxxxxxxxxxxxxxxxxxxxxxxxxxxx_____ |
| 23 | _____xxxxxxxxxxxxxxxxxxxxxxxxxxxxxxxx_____ |
| 24 | _____xxxxxxxxxxxxxxxxxxxxxxxxxxxxxxxx_____ |
| 25 | _____xxxxxxxxxxxxxxxxxxxxxxxxxxxxxxxx_____ |
| 26 | _____xxxxxxxxxxxxxxxxxxxxxxxxxxxxxxxx_____ |
| 27 | _____xxxxxxxxxxxxxxxxxxxxxxxxxxxxxxxx_____ |
| 28 | _____xxxxxxxxxxxxxxxxxxxxxxxxxxxxxxxx_____ |
| 29 | _____xxxxxxxxxxxxxxxxxxxxxxxxxxxxxxxx_____ |
| 30 | _____xxxxxxxxxxxxxxxxxxxxxxxxxxxxxxxx_____ |
| 31 | _____xxxxxxxxxxxxxxxxxxxxxxxxxxxxxxxx_____ |
| 32 | _____xxxxxxxxxxxxxxxxxxxxxxxxxxxxxxxx_____ |
| 33 | _____xxxxxxxxxxxxxxxxxxxxxxxxxxxxxxxx_____ |
| 34 | _____xxxxxxxxxxxxxxxxxxxxxxxxxxxxxxxx_____ |
| 35 | _____xxxxxxxxxxxxxxxxxxxxxxxxxxxxxxxx_____ |
| 36 | _____xxxxxxxxxxxxxxxxxxxxxxxxxxxxxxxx_____ |
| 37 | _____xxxxxxxxxxxxxxxxxxxxxxxxxxxxxxxx_____ |
| 38 | _____xxxxxxxxxxxxxxxxxxxxxxxxxxxxxxxxxxxxxxxxxxxxxxx |
| 39 | xxxx_____ |
| 40 | _xxxxxxxxxxxxxxxxxxxxxxxxxxxxxxxxxxxxxxxxxxxxxx_____ |
| 41 | _____xxxxxxxxxxxxxxxxxxxxxxxxxxxxxxxx_____ |
| 42 | _____xxxxxxxxxxxxxxxxxxxxxxxxxxxxxxxx_____ |
| 43 | _____xxxxxxxxxxxxxxxxxxxxxxxxxxxxxxxx_____ |

FIG. 15-2

| | |
|---|---|
| 44 | xxxxxxxxxxxxxxxxxxxxxxxxxxxxx |
| 45 | xxxxxxxxxxxxxxxxxxxxxxxxxxxxxx |
| 46 | xxxxxxxxxxxxxxxxxxxxxxxxxxxxxx |
| 47 | xxxxxxxxxxxxxxxxxxxxxxxxxxxxxx |
| 48 | xxxxxxxxxxxxxxxxxxxxxxxxxxxxx |
| 49 | xxxxxxxxxxxxxxxxxxxxxxxxxxxxxx |
| 50 | xxxxxxxxxxxxxxxxxxxxxxxxxxxxxx |
| 51 | xxxxxxxxxxxxxxxxxxxxxxxxxxxxxx |
| 52 | xxxxxxxxxxxxxxxxxxxxxxxxxxxxxx |
| 53 | xxxxxxxxxxxxxxxxxxxxxxxxxxxxxx |
| 54 | xxxxxxxxxxxxxxxxxxxxxxxxxxxxxx |
| 55 | xxxxxxxxxxxxxxxxxxxxxxxxxxxxxx |
| 56 | xxxxxxxxxxxxxxxxxxxxxxxxxxxxxx |
| 57 | xxxxxxxxxxxxxxxxxxxxxxxxxxxxxx |
| 58 | xxxxxxxxxxxxxxxxxxxxxxxxxxxxxx |
| 59 | xxxxxxxxxxxxxxxxxxxxxxxxxxxxxx |
| 60 | xxxxxxxxxxxxxxxxxxxxxxxxxxxxxx |
| 61 | xxxxxxxxxxxxxxxxxxxxxxxxxxxxxxx |
| 62 | xxxxxxxxxxxxxxxxxxxxxxxxxxxxxx |
| 63 | xxxxxxxxxxxxxxxxxxxxxxxxxxxxxx |
| 64 | xxxxxxxxxxxxxxxxxxxxxxxxxxxxxx |
| 65 | xxxxxxxxxxxxxxxxxxxxxxxxxxxxxxx |
| 66 | xxxxxxxxxxxxxxxxxxxxxxxxxxxxx |
| 67 | xxxxxxxxxxxxxxxxxxxxxxxxxxxx |
| 68 | xxxxxxxxxxxxxxxxxxxxxxxxxxxxxxxxxxxxxxxxxxxx |
| 69 | xxx |
| 70 | xxxxxxxxxxxxxxxxxxxxxxxxxxxxxxxxxxxxxxxxxxxxxx |

DISK SERVO PATTERN WRITING

CROSS REFERENCE TO RELATED APPLICATIONS

This application claims the benefit of the priority of U.S. Provisional Application Ser. No. 60/505,416, filed Sep. 23, 2003 and entitled "Viterbi Detection for Sequences with Changing Amplitude"; and this application claims the benefit of the priority of U.S. Provisional Application Ser. No. 60/505,947, filed Sep. 24, 2003 and entitled "Polarity Monitoring for Spiral Servo Detection".

TECHNICAL FIELD

The present disclosure describes systems and techniques relating to servos and disk servo patterns, for example, writing disk servo patterns based on detection of a spiral servo reference track using polarity monitoring.

BACKGROUND

In magnetic-medium-based storage devices, data is typically stored on circular, concentric tracks on a magnetic disk surface. A read-write head retrieves and records data on the magnetic layer of a rotating disk as it flies on a cushion of air over the disk surface. When retrieving data, magnetic field variations are converted into an analog electrical signal, the analog signal is typically amplified, converted to a digital signal and interpreted. To guarantee the quality of the information saved on and read back from the disk, the read-write head should be very accurately positioned at the center of the track during both writing and reading. Frequently, a closed-loop servo system, driven by servo information embedded in a dedicated portion of every track of the recording surface, is used to accurately position the head and follow the track.

The servo information defines the position of the data tracks and thus should be written with great accuracy in order for a head servo system to operate properly. Typically, the servo information is written on each surface as a radially extending set of spokes or wedges. The portion of a servo wedge at a particular track location may contain a sync field, an index mark, a gray coded track number, and two or more fine-positioned offset bursts configured in an echelon across the track. Head positioning relative to a track center can be determined and corrected, if necessary, by reading and noting the respective amplitudes and timings of the offset bursts.

Traditionally, a machine called a servo writer is used to write the embedded servo information on the disk surface. Commonly, a servo writer uses a large, massive granite base to minimize the effects of vibration. The servo writer can also use precision fixtures to hold the target drive, a precision, laser-interferometer-based actuator arm positioning mechanism to place the arms radially with respect to the axis of rotation of the disks in the drive, and an external clock head to position the servo wedges in time. Present servo writers are typically large and expensive, and as the typical track density increases, the servo writing time also increases, which can create a bottleneck in the disk drive manufacturing process at the servo writer station.

SUMMARY

The present disclosure includes systems and techniques relating to writing servo patterns in storage devices. According to an aspect of the described systems and techniques, a spiral servo reference track is written on a machine-readable medium. Timing information can be obtained from the spiral servo reference track on the machine-readable medium to determine head position, and a servo track with servo information can be generated based on the determined head position. Obtaining the timing information can involve determining a peak position of a diamond-shaped waveform and identifying occurrences of a timing-reference symbol in the spiral servo reference track.

Moreover, identifying occurrences of the timing-reference symbol can involve decoding an encoded repeating pattern using multiple framings of signal samples of a signal from the machine-readable medium, correlating the signal samples that indicate pattern transitions, for the multiple framings, with valid pattern transitions as defined by the encoding, accumulating the transition pattern correlations for the multiple framings, selecting one of the multiple framings as a correct framing for decoding based on the accumulated correlations, and determining a waveform polarity for the signal based on the repeating pattern and the selected correct framing. The systems and techniques described can assure a reliable detection of the symbols in a spiral servo reference track, even with a reversed waveform polarity, and can indicate the presence of the reversed polarity and correct for it on the fly.

Details of one or more implementations are set forth in the accompanying drawings and the description below. Other features, objects and advantages may be apparent from the description and drawings, and from the claims.

DRAWING DESCRIPTIONS

FIG. 9 shows a table presenting an example set of relationships between the input symbols and sampled channel outputs for a spiral servo reference track.

FIGS. 10 and 11 illustrate processing of a spiral servo reference track waveform.

FIGS. 12 and 13 illustrate numerical results for simulations of a servo track generator that uses modified Viterbi detection and polarity monitoring to accurately identify timing-reference symbols in a spiral servo reference track.

FIGS. 14-1, 14-2, 15-1 and 15-2 illustrate the phase uncertainty tolerance for simulations of traditional Viterbi detection and modified Viterbi detection.

Like reference symbols in the various drawings indicate like elements.

DETAILED DESCRIPTION

Figure 1:
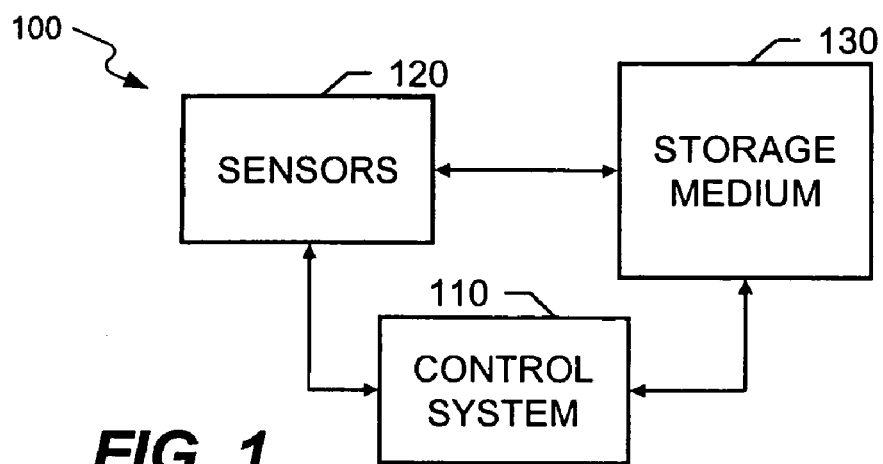
FIG. 1 is a block diagram illustrating a servo pattern writing system.

FIG. 1 is a block diagram illustrating a servo pattern writing system 100. The system 100 includes one or more sensors 120 that are used with an attached storage medium 130 (e.g., a platter in a disk drive coupled with the servo writer) to locate the radial and circumferential position of a write head. A control system 110 uses information from the sensor(s) 120 and causes the write head to produce a pattern of information on the storage medium 130.

The system 100 represents a self-servo scheme that can significantly reduce the time and expense of the servo-writing process. Instead of slowly writing servo information on every track, a much smaller number of spiral servo reference tracks with particular data pattern(s) can be written from OD (outside diameter) to ID (inside diameter) on a disk surface by moving the write head at a constant linear velocity from OD to ID evenly while the disk is spinning at a constant angular velocity. The spiral servo reference tracks provide a defined pattern over the disk surface but are not themselves servo information, as they cannot be used as a master reference by a disk drive during normal operation to locate tracks and sectors for data storage.

The spiral servo reference tracks can be used by a device other than the servo writer to acquire timing information used in accurately deciding the position of the head, both radially and circumferentially. This same device can then write servo information (e.g., conventional servo patterns) onto one or more disk surfaces, including the disk surface with the spiral reference tracks. For example, the system 100 can be used in a manufacturing process to put spiral servo reference tracks on a single platter in a hard drive. Then the hard drivers own read-write head(s) and servo system can be used to write servo information onto all the platters in the disk drive based on the timing information acquired from the spiral servo reference tracks.

Figure 3:
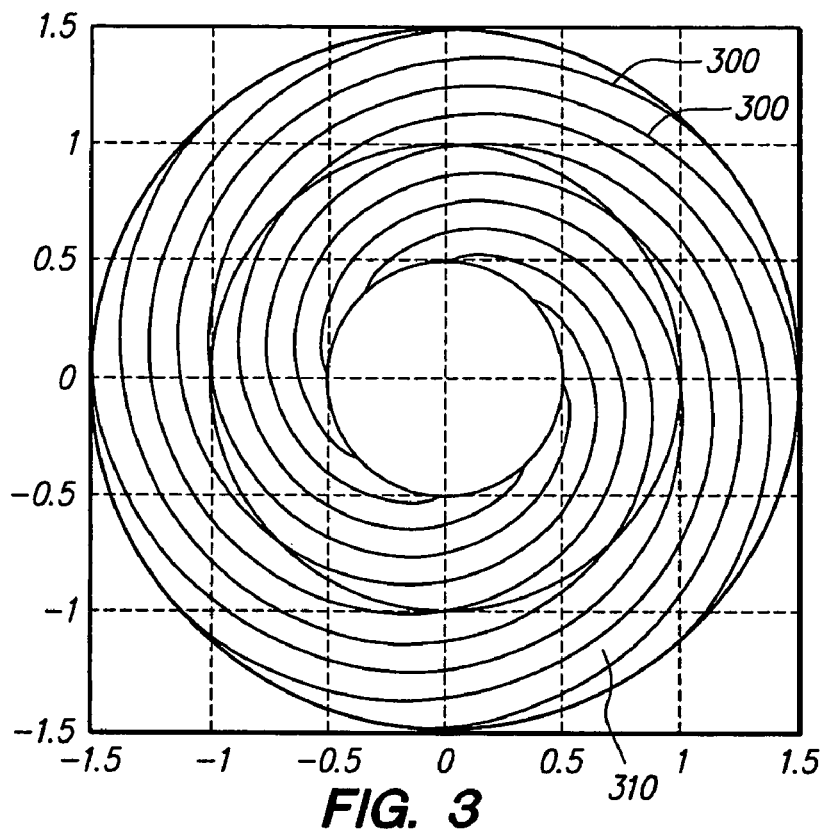
FIG. 3 illustrates spiral servo reference tracks on a disk surface.
Figure 4:
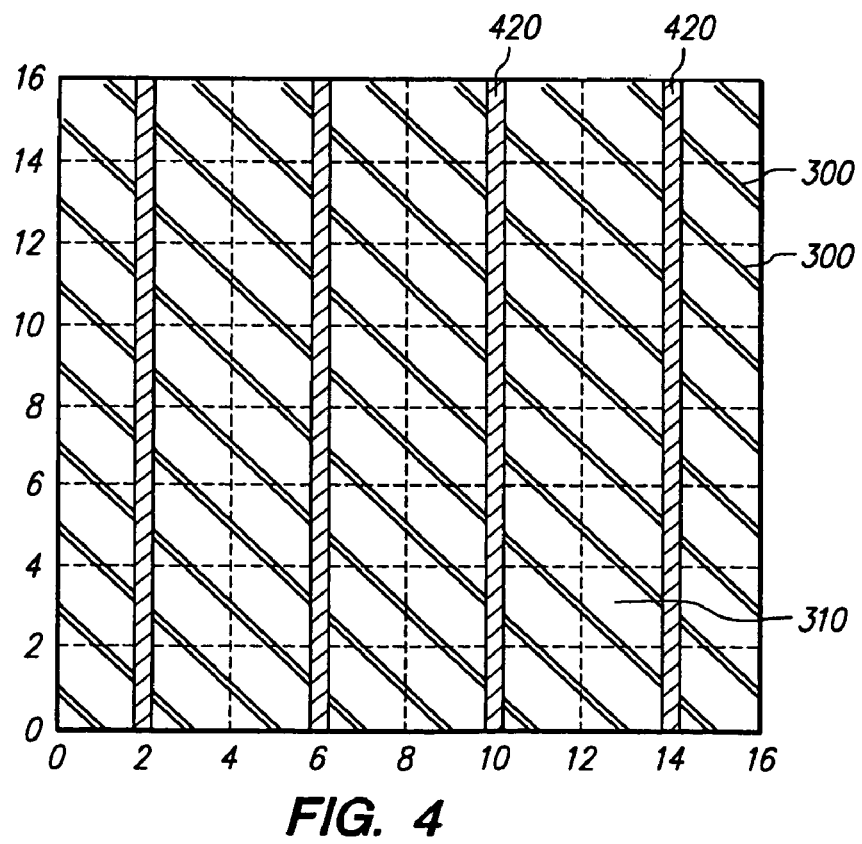
FIG. 4 illustrates a finished servo pattern on a disk surface.

FIG. 3 illustrates spiral servo reference tracks 300 on a disk surface 310. FIG. 4 illustrates a finished servo pattern on the disk surface 310. FIGS. 3 and 4 illustrate the track patterns on the disk surfaces generally and do not indicate particular dimensions or units. The finished servo pattern shown can include conventional servo information, which is written in servo spokes or wedges 420 over the spiral tracks 300 on the disk surface 310. The number of spiral tracks 300 can be at least twice as large as the number of servo spokes 420 to be written on each surface. This can help in guaranteeing that even if some of the spiral tracks 300 are over-written by the servo spokes 420 during the self-servo writing process, there are still enough spiral tracks 300 to provide sufficient head-positioning information for the process to go on to completion. Once the servo information has been written, the spiral tracks 300 are no longer needed and can be overwritten by data tracks.

Figure 2:
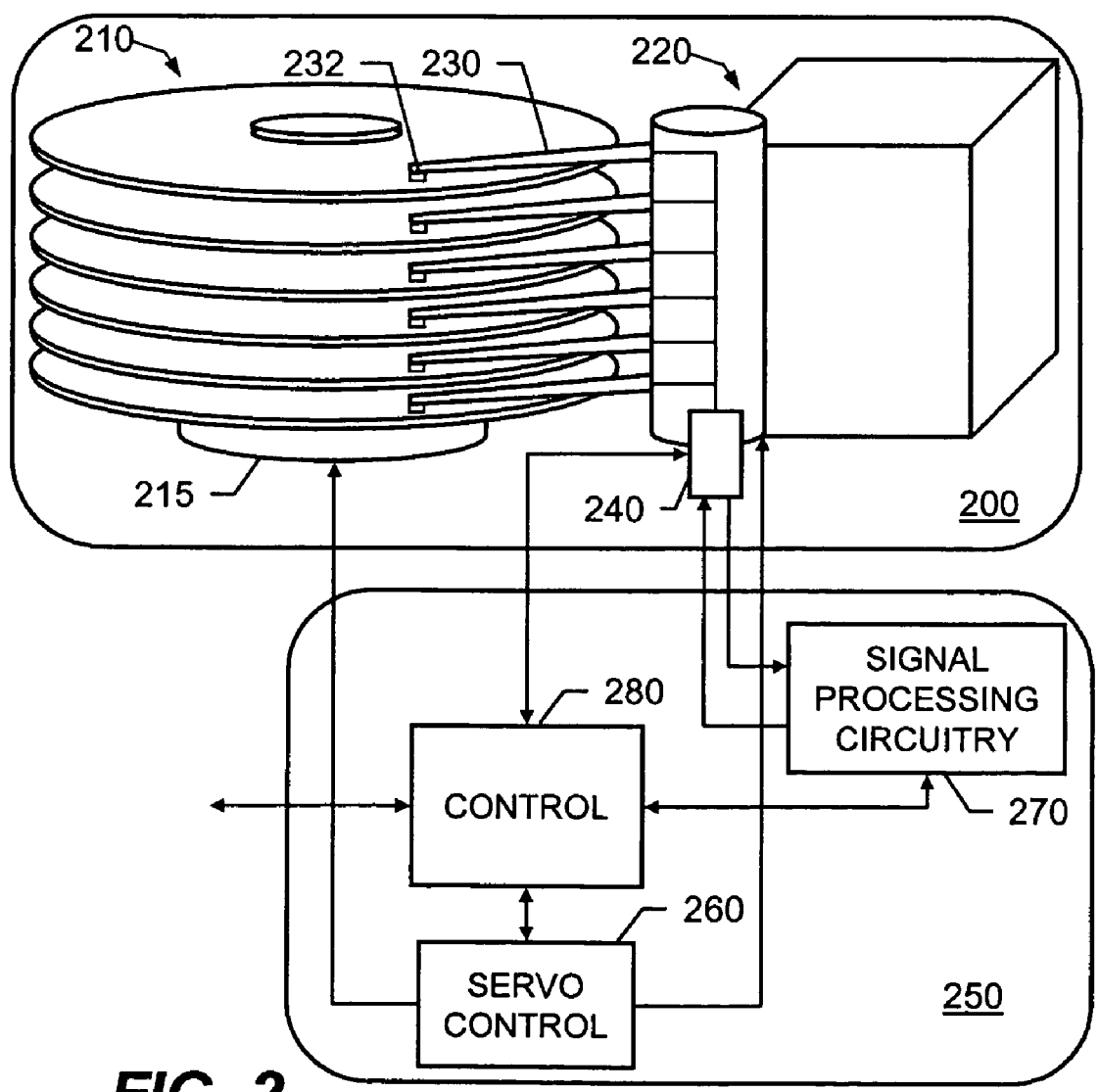
FIG. 2 is a block diagram illustrating a magnetic-medium disk drive that uses modified Viterbi detection and polarity monitoring to write servo information.

FIG. 2 is a block diagram illustrating a magnetic-medium disk drive that uses modified Viterbi detection and polarity monitoring to write servo information. The disk drive includes a head-disk assembly (HDA) 200 and drive electronics 250 (e.g., a printed circuit board (PCB) with semiconductor devices). The HDA 200 includes several disks 210 mounted on an integrated spindle and motor assembly 215. The motor assembly 215 rotates the disks 210 near read-write heads connected with a head assembly 220 in the HDA 200. The disks 210 can be coated with a magnetically hard material (e.g., a particulate surface or a thin-film surface) and can be written to or read from a single side or both sides of each disk.

A head 232 on an arm 230 can be positioned as needed to read data on the disk. A motor (e.g., a voice coil motor or a stepper motor) can be used to position the heads over the desired track(s). The arm 230 can be a pivoting or sliding arm and can be spring-loaded to maintain a proper flying height for the head 232 in any drive orientation. A closed-loop head positioning system can be used.

The HDA 200 can include a read-write chip 240, where head selection and sense current value(s) can be set. The read-write chip 240 can amplify a read signal before outputting it to signal processing circuitry 270. The signal processing circuitry 270 can include a read signal circuit, a servo signal processing circuit, and a write signal circuit.

Signals between the HDA 200 and the drive electronics 250 can be carried through a flexible printed cable. A controller 280 can direct a servo controller 260 to control mechanical operations, such as head positioning through the head assembly 220 and rotational speed control through the motor assembly 215. The controller 280 can be one or more integrated circuit (IC) chips (e.g., a combo chip). The controller 280 can be a microprocessor and a hard disk controller. The drive electronics 250 can also include various interfaces, such as a host-bus interface, and memory devices, such as a read only memory (ROM) for use by a microprocessor, and a random access memory (RAM) for use by a hard disk controller.

The HDA 200 and drive electronics 250 can be closed in a sealed container with an integral air filter. For example, the hard disk drive can be assembled using a Winchester assembly. The rotating platter can be driven by a brush-less DC motor, and the rotational frequency can be accurately servo-locked to a crystal reference.

The disk drive includes a servo track generator that obtains timing information from the spiral servo reference track on the machine-readable medium and writes a servo track on the machine-readable medium based on the obtained timing information. The servo track generator can be composed of multiple sets of coordinating circuitry and can be integrated with the components described above or organized into a separate component of the disk drive. For example, the servo track generator can be integrated into the controller 280 and the signal processing circuitry 270.

Figure 5:
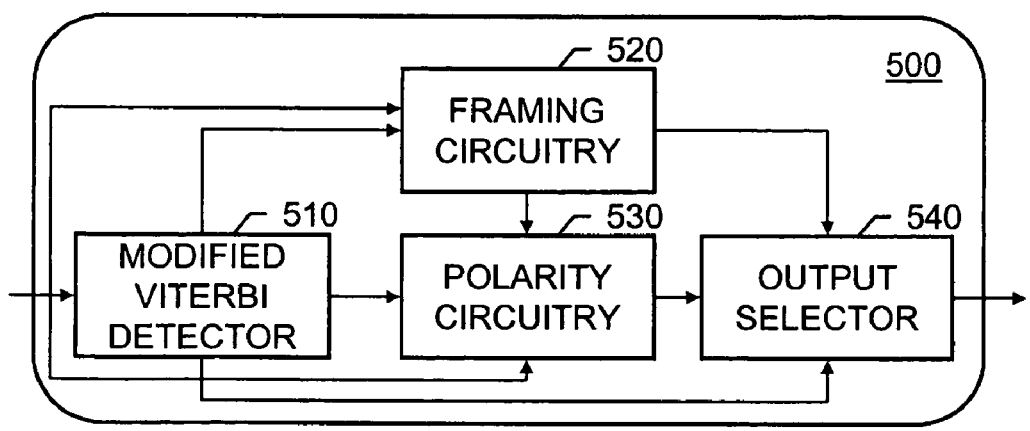
FIG. 5 is a block diagram illustrating a servo track generator that can be used in the disk drive of FIG. 2.

FIG. 5 is a block diagram illustrating a servo track generator 500 that can be used in the disk drive of FIG. 2. The servo track generator 500 includes a modified Viterbi detector 510 that decodes a repeating pattern in the spiral servo reference track, using the systems and techniques described below in connection with FIGS. 7 and 8, for multiple framings of the repeating pattern. The servo track generator 500 also includes framing and polarity monitoring circuitry 520, 530 that indicates one of the multiple framings as a proper framing and indicates reversed polarity based on the repeating pattern in the spiral servo reference track.

The framing and polarity monitoring circuitry 520, 530 can include output pattern correlation accumulators that retain measures of correlation between sampled output and expected output for pattern transitions in the encoded repeating pattern for the multiple framings used by the modified Viterbi detector 510. The framing and polarity monitoring circuitry 520, 530 can identify reversed polarity by checking if a signal-indicated framing is different than a pattern-transition-correlation indicated framing. Alternatively, the framing and polarity monitoring circuitry 520, 530 can identify reversed polarity by checking for an inordinate number of timing-reference symbols in the decoded pattern.

An output selector 540 can select the appropriately framed, decoded output from the detector 510 and reverse the polarity of the decoded output, if needed, based on the output of the framing circuitry 520 and the output of the polarity circuitry 530. A more detailed example of the operations of a servo track generator in a storage device is now described in connection with FIGS. 6-11.

Figure 6:
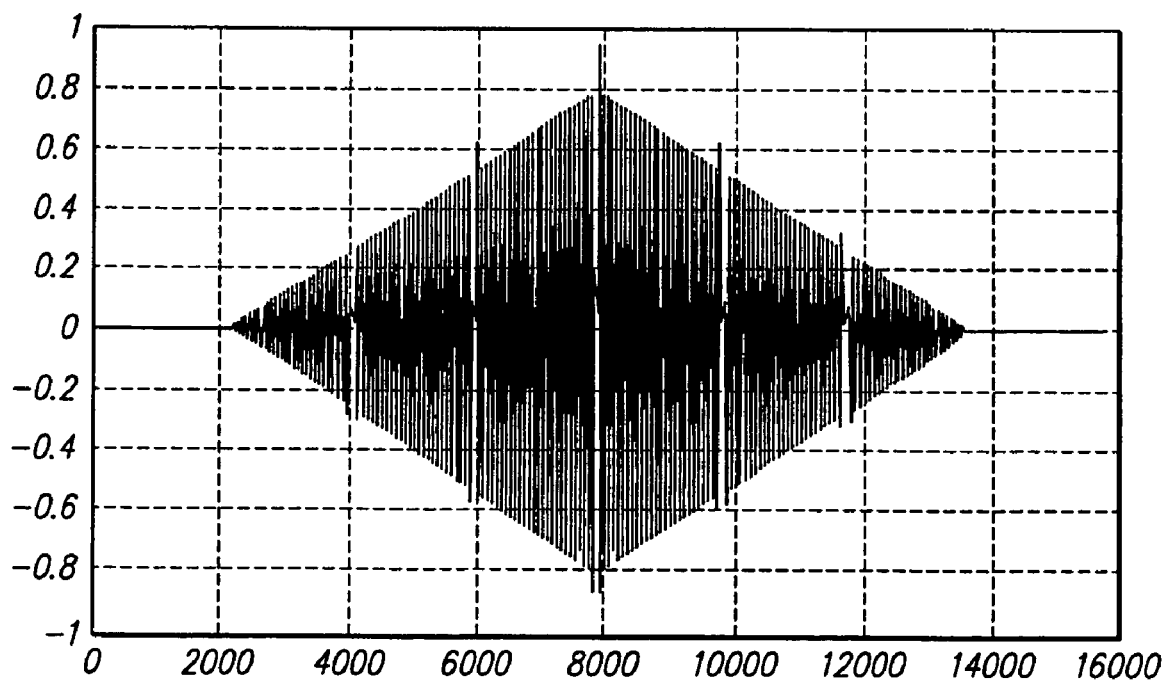
FIG. 6 illustrates a diamond shaped waveform obtained by reading a spiral servo reference track as though it were a circular, concentric track.

FIG. 6 illustrates a diamond shaped waveform 600 obtained by reading a spiral servo reference track as though it were a circular, concentric track. Once a spiral servo reference track is written on a disk surface, a read head that passes over the disk surface in a circular fashion intersects the track at an angle. Because of this angle, the signal the head picks up from the spiral track has a diamond-shaped amplitude. FIG. 6 illustrates this diamond shaped waveform, plotting the signal amplitude against an index of samples (the data being sixteen times oversampled for purposes of illustration). Determining the head position can be generally translated into deciding the peak position of the diamond-shaped waveform 600.

Figure 7:
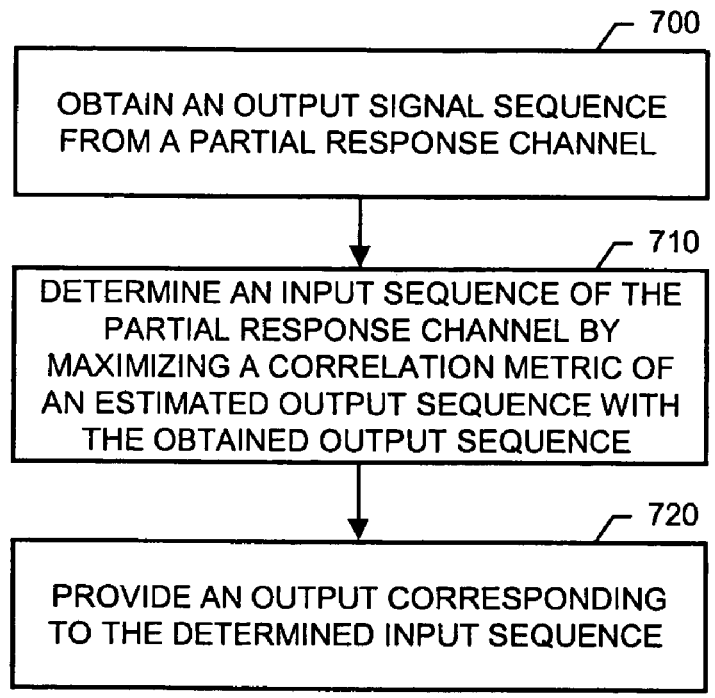
FIG. 7 is a flowchart illustrating Viterbi detection using a correlation metric.

The spiral tracks are written using a repeating pattern. This repeating pattern can be identified using modified Viterbi detection techniques. FIG. 7 is a flowchart illustrating Viterbi detection using a correlation metric. An output signal sequence is obtained from a partial response channel (e.g., sampling a signal generated from a data storage medium) at 700. An input sequence of the partial response channel is determined by maximizing a correlation metric of an estimated output sequence with the obtained output sequence at 710. The estimated output sequence is estimated based on the partial response channel. An output corresponding to the determined input sequence is provided at 720.

Providing the output corresponding to the determined input sequence can involve providing the determined input sequence to an additional sequence processing component. Providing the output corresponding to the determined input sequence can involve other or different outputs as well. Moreover, the output signal sequence obtained from the partial response channel can be a convolution of the input sequence and a target polynomial of the partial response channel.

The input sequence to a target channel can be defined as $B=[b_0\ b_1\ \ldots\ b_N]$, and the target partial response can be defined as $P=[p_0\ p_1\ \ldots\ p_M]$—If the channel noise is white, additive and Gaussian, then the output of the partial response channel can be given as $Y=[y_0\ y_1\ \ldots\ y_N]$, where $$y_k = \sum_{i=0}^{M} b_{k-i} \cdot p_i + n_k,$$

and $n_k$ is the additive white Gaussian noise. Y is the convolution of the input sequence and the target polynomial, as received.

A traditional Viterbi detector finds an input sequence, $\hat{B}=[\hat{b}_0\ \hat{b}_1\ \ldots\ \hat{b}_N]$, such that the corresponding output sequence of the partial response channel, $\hat{Y}=[\hat{y}_0\ \hat{y}_1\ \ldots\ \hat{y}_N]$, is the closest to the real sampled output sequence, Y, in the sense of Euclidean distance. Traditional Viterbi minimizes the quantity $$\sum_{k=0}^{N} (y_k - \hat{y}_k)^2,$$

by the choice of $\hat{B}$.

When there is uncertainty about the gain of the partial response channel, then a gain factor can be introduced in the target partial response, and the target partial response can be written as $P'=[\alpha p_0\ \alpha p_1\ \ldots\ \alpha p_M]$. This equation assumes that the function only changes in the amplitude; the relative scaling of the different terms remains the same. The traditional Viterbi decision sequence should then be the estimated input sequence $\hat{B}'=[\hat{b}_0'\ \hat{b}_1'\ \ldots\ \hat{b}_N']$, which minimizes the quantity, $$\sum_{k=0}^{N} (y_k - \hat{y}_k')^2, \quad (1)$$

where $$\hat{y}_k' = \sum_{i=0}^{M} \hat{b}_{k-i}' \cdot \alpha \cdot p_i = \alpha \cdot \sum_{i=0}^{M} \hat{b}_{k-i}' \cdot p_i = \alpha \cdot y_k^*,$$

and $$y_k^* = \sum_{i=0}^{M} \hat{b}_{k-i}' \cdot p_i.$$

The quantity in equation (1) can be re-written as, $$\sum_{k=0}^{N} (y_k - \hat{y}_k')^2 = \quad (2)$$

$$\sum_{k=0}^{N} (y_k - \alpha \cdot y_k^*)^2 = \sum_{k=0}^{N} y_k^2 + \alpha^2 \cdot \sum_{k=0}^{N} (y_k^*)^2 - 2\alpha \sum_{k=0}^{N} y_k \cdot y_k^*.$$

The three terms on the right side of equation (2) can be understood as the summation of the square of the real output of the channel, the summation of the square of the estimated channel output scaled by the channel gain factor, and the cross-correlation of the real channel output and the estimated channel output scaled by the channel gain factor. Since $$\sum_{k=0}^{N} y_k^2$$

is not a function of the choice of $\hat{B}$ (the estimated input sequence), minimizing the quantity in equation (2) over B' is equivalent to minimizing $$\alpha^2 \cdot \sum_{k=0}^{N} (y_k^*)^2 - 2\alpha \sum_{k=0}^{N} y_k \cdot y_k^* \quad (3)$$

or, since α is not a function of the estimated input, $$\alpha \cdot \sum_{k=0}^{N} (y_k^*)^2 - 2 \sum_{k=0}^{N} y_k \cdot y_k^*. \quad (4)$$

When α is small, the first term in equation (4) can be ignored, and the Viterbi algorithm can be used to minimize the second term (i.e., maximize the correlation, as the second term is negative in equation (4)). When the noise power is not changing with the amplitude of the signal and the signal amplitude is very small, maximizing the second term is essentially the same as minimizing the whole quantity, providing close to optimal performance.

When the signal amplitude is very large, the first term in equation (4) is still ignored, resulting in less than optimal performance as compared with traditional Viterbi in terms of error probability. But because the signal to noise ratio (SNR) is higher with larger amplitudes of the signal, good results can still be obtained. By maximizing the correlation between the sampled sequence and the recovered sequence, received sequences can be accurately interpreted, even when the signal carrying the sequences has a widely varying amplitude. A signal processing apparatus using these techniques can be biased to the worst case, guaranteeing the performance of the worst case scenario.

Figure 8:
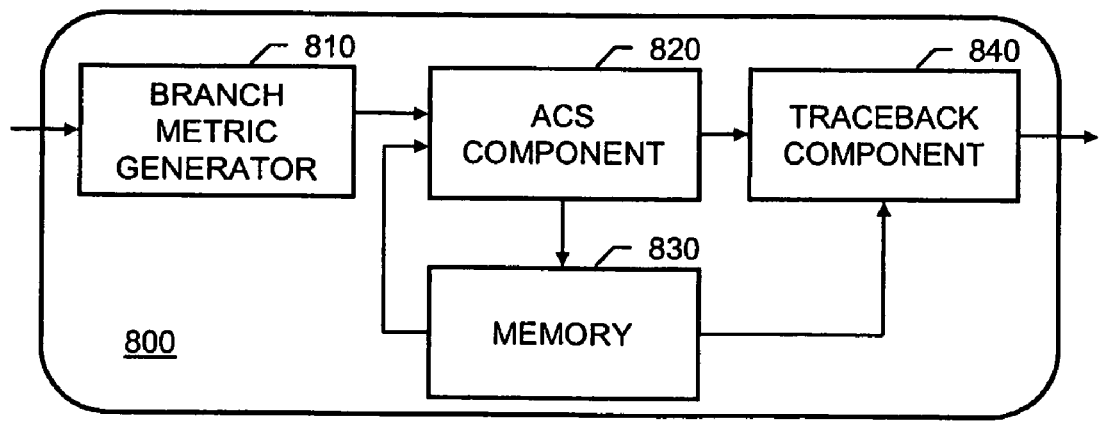
FIG. 8 is a block diagram illustrating a signal processing apparatus that implements Viterbi detection using a correlation metric.

FIG. 8 is a block diagram illustrating a signal processing apparatus 800 that implements Viterbi detection using a correlation metric. The apparatus 800 can be implemented using the systems and techniques of conventional Viterbi detectors, including basing the operation on a trellis. The apparatus 800 includes a branch metric generator 810, an add-compare-select (ACS) component 820, a memory 830, and a traceback component 840. The branch metric generator 810 calculates correlation branch metrics between received data and predetermined code sequences, and supplies the results to the ACS component 820.

The ACS component 820 adds the branch metrics to any saved state metrics (i.e., retained correlation path metrics) according to a trellis, which shows the progression of the decoding in time based on the inputs. The ACS component 820 compares current correlation path metrics and selects the paths in the trellis with the best correlation path metrics (e.g., maximum or minimum value, depending on implementation). The selected paths and their path metrics can be saved in the memory 830. The memory 830 can be one or more random access memories, and can be integrated into the various components of the apparatus 800 (e.g., path metrics can be saved in a first memory integrated into the ACS component 820, and survivor paths can be saved in a second memory integrated into the traceback component 840).

The traceback component 840 looks at the survivor paths to identify the path having the largest correlation with the received data, and outputs decoded data. If the target polynomial is $T(D)=p_0+p_1 D+\ldots+p_M D^M$, then the trellis has $2^M$ states. A transition, or branch, in the trellis represents a possible change from state to state. For each of the states, a survivor path and a path metric can be updated and saved for each input sample to the detector.

Assuming binary data detection, for each current state there are two immediate previous states that lead into the current state. The path metric of this current state can be updated according to the following equation $$pm_k^j = \max\{pm_{k-1}^m + bm_{m,j}, pm_{k-1}^n + bm_{n,j}\}, \quad (5)$$

where $pm_k^j$ is the path metric of the j-th state at time k; $pm_{k-1}^m$, and $pm_{k-1}^n$ are the path metrics at time k−1 of the m-th and n-th states, respectively, which lead into the j-th state; $bm_{X,j}$ is the metric of the branch that connects the X-th state (m or n) and the j-th state, and can be defined as:

$$bm_{X,j} = y_k \cdot \hat{y}_k, \quad (6)$$

where $\hat{y}_k$ is the ideal noiseless output associated with that branch.

Once the path metric for the j-th state is decided, its path memory can also be decided by inheriting the path memory of the one of the two previous states (m or n) that gives it the best path metric, and adding to this inherited path the most current one of the binary bits that constitute the current, j-th, state. Using these modified Viterbi decoding techniques, all the survivor paths associated with all the different states can merge in M steps (e.g., M clock cycles), and thus the path memories need not be longer than M in some implementations.

The apparatus 800 can also include a controller, and input and output buffers, including a frame synchronization mechanism. The apparatus 800 can be implemented in any number of different systems and devices, including communications equipment (e.g., in wireless communications where fading issues and varying-amplitude signals are common) and data storage equipment. For example, the apparatus 800 can include a read channel, which can be implemented as one or more integrated circuit (IC) devices, and the read channel can include a variable-gain amplifier (VGA), a filter, and an ADC (analog to digital converter). The range of the signal to be processed can be estimated in advance, and the target partial response for use in the modified Viterbi detector can be based on the maximum value of this range estimate.

Referring again to FIG. 6, the data pattern in a spiral reference track can be a repeating sequence of multiple one symbols followed by a zero symbol (e.g., twenty nine ones plus a zero, and then repeat). This reference track pattern can be generated using gray-coded symbols. The symbols can be coded using a Manchester code. For example, the symbols can be coded according to the following rules: a one symbol is mapped to 0011, and a zero symbol is mapped to 1100. When the pattern is 29 one symbols followed by 1 zero symbol, the length of the repeating pattern is 30 Gray coded symbols or 120 channel bits. One repetition of the sequence is referred to as one frame, and a typical length of the diamond-shaped waveform 600 can be 6 frames, or 720 channel bits.

As illustrated in FIG. 6, whenever there is a zero symbol in the sequence of one symbols, there is a gap 610 in the waveform 600. These zero symbols serve as landmarks for additional accuracy in deciding timing and can be accurately and reliably located in the waveform 600. In addition to other factors that affect the detection of the zero symbols, such as changing amplitude and noise, there is also the sampling phase and the polarity of the waveform. In practice, the sampling phase and the polarity of the waveform 600 may be unknown when it comes time to read a spiral servo reference track (e.g., a new read operation can require a new stimulating current for the read head, which can impart a random polarity to the read signal in a disk drive).

FIG. 9 shows a table 900 presenting an example set of relationships between the input symbols and sampled channel outputs for a spiral servo reference track. Because of the rate 1/4 coding, which maps "1" to "0011" and "0" to "1100", there is only one bit of information for every four channel bits. To reliably detect the underlying symbols from the sampled sequence, the sampled sequence should be correctly framed into groups of four samples so that each group of four samples is truly correlated to one particular symbol.

Based on the possible sampling phases, there can be two different targets for a modified Viterbi detector, both targets being approximate targets. The table 900 shows the targets for peak sampling and shoulder sampling in the fifth and sixth columns, respectively. FIGS. 14-1, 14-2, 15-1 and 15-2 illustrate the phase uncertainty tolerance for simulations of traditional Viterbi detection and modified Viterbi detection. Peak sapling is assumed in the simulations, and thus the corresponding target in the fifth column of the table 900 is used. Both detection techniques are tested using all possible sampling phases and sixteen time over-sampling; thus, there are sixty four sampling phases that cover a complete symbol duration with sixteen times over-sampling.

In FIGS. 14-1 and 14-2 a first table 1400 shows the simulation results using traditional Viterbi detection, and FIGS. 15-1 and 15-2 a second table 1500 shows the simulation results using the new Viterbi detection. In these two tables, the vertical indices represent time, which is linearly related to the change in signal amplitude. In this example, as time goes on, the signal amplitude is linearly increased from zero to a maximum value and then is linearly decreased to zero. Each step on the time indices is one symbol duration or four channel clock cycles. The time indices do not cover the entire diamond-shaped waveform. They cover the first one or two frames at the beginning of the waveform, which is sufficient to compare the two approaches.

The horizontal indices represent different sampling phases covering a complete symbol duration. An oversampling rate of sixteen is used, and as there are four channel clock cycles per symbol, there are a total of sixty four (16×4) different sampling phases.

In the simulations illustrated, the perfect sampling phase is at the center of each table. An ex mark in the table represents detection of a one symbol, and an underscore mark represents detection of a zero symbol. A correctly detected sequence should be an almost all ones sequence with the zero symbol appearing every thirty symbols starting at the thirty ninth position.

Comparing the two tables 1400 and 1500 illustrates that the new modified Viterbi detector provides accurate detection decisions with robust tolerance of phase uncertainty, even when the amplitude of the signal is very small (i.e., as indicated by small numbers in the vertical indices). In contrast, only when the signal amplitude is large can the traditional Viterbi detector make correct decisions, and the range of phase error tolerance is much smaller (i.e., narrower bars of exes indicate reduced sampling phase range). Thus, the new Viterbi detection approach can produce high accuracy with a large sampling phase range, providing very good performance with a signal of changing amplitude and high phase uncertainty. The new Viterbi detector can provide relatively uniform response by phase, and good decisions are made as long as the sampling phase is fairly close to expectations (e.g., good decisions can be made even if the sampling phase is off from the optimal sampling phase by $$\pm \frac{\pi}{2}).$$

In the context of spiral servo reference detection, the framing and/or sampling phase may be unknown beforehand. However, information regarding the frequency of the channel bits is available, and this information can be used to set the sampling rate. The read-back waveform can be sampled using the channel bit clock rate with an arbitrary sampling phase, and thus one sample can be collected for every channel bit. The phase of this sampling is unknown at the time the sampling begins. However, because a single symbol has a duration of four channel clock cycles, the four samplings in the duration of a symbol represent four sampling phases for framing the sequence for the duration of the symbol; one of the four phases is closest to the optimal sampling phase.

To overcome the uncertainty in framing and sampling phase, sequence detection can be performed for each of the four possible framings of the sampled sequence, and the results saved. After further processing, the best of the four framings can be determined, and the corresponding detection results can be chosen as the final results of the detection. Although the uncertainty of the sampling phase as measured by a fraction of a channel clock cycle is still present, the systems and techniques described allow selection of a framing phase that is within plus or minus half a channel clock cycle of the optimal sampling phase, and thus acceptable performance can be provided.

FIGS. 10 and 11 illustrate processing of a spiral servo reference track waveform. A symbol sequence 1000 is an example portion of a spiral servo reference tack sequence of consecutive one symbols followed by one zero symbol and then one symbols again. A corresponding rate 1/4 encoded sequence of channel bits 1020 is shown just below the symbol sequence 1000. A digital waveform 1040 illustrates the positive and negative transitions used in writing the encoded sequence 1020 to a storage medium. An analog waveform 1060 illustrates the corresponding signal obtained by reading the spiral servo reference track. As shown, a positive transition in the binary waveform results in a positive pulse in the read back signal, and a negative transition in the binary waveform results in a negative pulse in the read back signal. The zero symbol is thus indicated in the read back signal by a longer than usual distance between two adjacent signal peaks.

When sampling the waveform 1060, it is important to have proper framing, where each set of four samples is accurately correlated with the corresponding symbol. A sequence of baud-rate samples 1080 corresponds to the sampled analog waveform 1060 (assuming shoulder sampling). The pluses, minuses, and zeros represent the polarity of the sample. FIG. 11 illustrates a trellis 1150 that includes the described states and the predefined sample polarities that indicate a valid transition from one state to another. As shown, there are four kinds of transitions from symbol to symbol, and each transition has a corresponding sampled output (i.e., the transition polarity patterns shown between the old bit pattern on the left and the new bit pattern on the right).

Most of the symbols in the spiral servo reference tack sequence are repeated one symbols, which generate a sinusoidal type waveform at the read back point, as shown (a repeating pattern of −−++ samples). Samples from this approximate sinusoidal portion of the waveform 1060 can be used to decide an initial framing for sampling. Samples from the sinusoidal waveform can be used to chop the sequence into groups of 4 samples so that each group of 4 corresponds to one input symbol. A certain polarity (e.g., positive) of the waveform can be assumed here, and this assumption can be checked later on and corrected if found to be inaccurate. Although shoulder sampling is discussed as a system model used to carry on detection, the systems and techniques described can work equally well with any initial phase setting; the sampling phase can be completely random. When setting the initial framing for sampling, several groups of the repeating one symbol sections can be averaged together to reduce the effects of noise in the signal.

As noted above, setting the initial framing in this manner assumes that the polarity of the signal is known. Reversing the polarity of the signal results in the opposite grouping. For example, if a sampled sequence should be:

xx++−−++−−++−−++−−++−−++−−++00−−00++−−++, but the polarity is reversed, then the sampled sequence will be:

xx−−++−−++−−++−−++−−++−−++−−00++00−−++−−.

Based on the sinusoidal part of the sampled sequence alone, the framing would then initially be decided incorrectly to be:

xx, −−++, −−++, −−++, −−++, −−++, −−++, −−00, −−00, −−++, −−xx.

A reversed sinusoidal waveform is still a sinusoidal waveform, and a framing that is based solely on a reversed sinusoidal waveform will result in a framing that is shifted from the correct framing by two channel bits.

Comparing the incorrectly framed samples above with the trellis 1150 shows that the grouped samples "−−00" and "++00" are not valid symbol-to-symbol transitions because they do not match the ideal channel output patterns shown in the trellis 1150. With such a wrong framing of the samples, Viterbi detection is likely to make incorrect decisions at those transitions.

In the case of reversed polarity with correct framing, the sampled sequence is divided into groups of four samples that are all valid transition patterns according to the trellis 1150. However, Viterbi detection on these samples yields a sequence of symbols with reversed polarity. For example, the detection results based on the following sampled sequence and framing, xx−−, ++−−, ++−−, ++−−, ++−−, ++−−, ++−−, 00++, 00−−, ++−−, would be,

"0" "0" "0" "0" "0" "0" "0" "1" "0" "0".

Thus, when the wrong framing is initially selected as described above, this incorrect framing is off from the correct framing by two channel clock cycles, and the error in the initial framing can be detected in the grouped samples when there is a 1→0 or a 0→1 transition.

The 1→0 and 0→1 transitions are associated with the output patterns 00−− and 00++, respectively, when the framing is correct. In contrast, the 1→0 and 0→1 transitions are associated with the output patterns −−00 and ++00, respectively, when the framing is incorrect. Thus, by decoding the spiral servo reference track pattern using multiple framings (e.g., two framings as indicated by the sinusoidal part of the waveform, or all four possible framings) and then correlating samples indicating pattern transitions in the multiple framings with valid output pattern transitions, the proper framing and thus the proper decoded output can be determined.

A modified Viterbi detector, as described above, can decode the spiral servo reference track pattern multiple times using the four possible framings. The modified Viterbi detector can handle the changing amplitude. Moreover, because the branch metric calculation is simplified in the modified Viterbi detector, decoding decisions can be made very rapidly.

For each framing, whenever the Viterbi detector sees a 1→0 or a 0→1 transition, the detector can correlate the corresponding group of four samples with the valid pattern of output associated with the transition. In practice, this correlation need not take into consideration all four samples, as the difference between the expected output and the sampled output when the framing is wrong can be seen in each of the samples (e.g., each of the four samples, −−00, for a 1→0 transition identified using the wrong framing on a reversed polarity waveform is different than the expected four samples, 00−−, for a correct framing of a normal polarity waveform). The correlation can be accumulated into four integrators, one for each framing. After a number of 1→0 and/or 0→1 transitions, the four accumulators associated with the four framings can be compared. The number of transitions to be observed before the values can be used can depend on the signal to noise ratio of the particular application. A typical number of transitions needed can be around 100. Additionally, the number of transitions to be observed can be made programmable in a system.

The accumulator with the largest value indicates that its corresponding framing is the correct framing. If the decoded output for the correct framing has more zero symbols than one symbols, or if the initial framing indicated by the generally sinusoidal portion of the waveform is different than the correct framing, this indicates that the polarity has been reversed, and the decoded output symbols can be reversed in polarity to provide the correct output.

FIGS. 12 and 13 illustrate numerical results for simulations of a servo track generator that uses modified Viterbi detection and polarity monitoring to accurately identify timing-reference symbols in a spiral servo reference track. In these example simulations, the symbol sequence is a repeating pattern of seven ones and one zero. The channel is assumed to be equalized to PR4 (Class-4 Partial Response) target, and an ideal shoulder sampling phase is granted. White, additive Gaussian noise is added to the waveform so that the peak-to-rms (root mean square) SNR is about 12 dB (Decibel).

A first table 1200 shows the results of the Viterbi detection output and the accumulator values for all four framings (phases 0, 1, 2, and 3) of a waveform with correct polarity. The Viterbi detector performs detection on all four framing phases, and the accumulated correlation values are saved for all four framing phases. Based on the sinusoidal part of the waveform, the best framing is initially decided to be phase 2. Then the accumulator of phase 2 is compared with the accumulator of phase 0 (the opposite phase, which is two clock cycles away). Because the accumulator for phase 2 holds a larger value than the accumulator for phase 0, the initial choice of phase 2 as the best framing phase is confirmed, and the associated detected symbol sequence is chosen to be the final output of the detection.

A second table 1300 shows the results of the Viterbi detection output and the accumulator values for all four framings of a waveform with reversed polarity. Again, the Viterbi detector performs detection on all four framing phases, and the accumulated correlation values are saved for all four framing phases. Based on the sinusoidal part of the waveform, the best framing is initially decided to be phase 0. Then the accumulator of phase 0 is compared with the accumulator of phase 2 (the opposite phase, which is two clock cycles away). Because the accumulator for phase 0 holds a smaller value than the accumulator for phase 2, the initial choice of phase 0 as the best framing phase is rejected because the polarity of the waveform has been reversed, the opposite framing (phase 2) is selected as the best framing phase, and the detected symbol sequence associated with phase 2 is chosen, with polarities of all the bits reversed, to be the final output of the detection.

In the second simulation, the wrong framing phase based on the sinusoidal part of the waveform gives a symbol error rate of approximately 0.124, but with polarity monitoring, the symbol error rate is reduced to approximately 2.625e-4. Thus, using the polarity monitoring as described significantly improves the accurate identification of the timing-reference symbols in the spiral servo reference track.

A few embodiments have been described in detail above, and various modifications are possible. Thus, other embodiments may be within the scope of the following claims.

What is claimed is:

1. A method comprising:
   obtaining timing information from a spiral servo reference track on a machine-readable medium to determine head position; and
   generating a servo track with servo information based on the determined head position;
   wherein the obtaining comprises determining a waveform polarity of a signal from the spiral servo reference track on the machine-readable medium.

2. The method of claim 1, wherein the spiral servo reference track comprises multiple non-overlapping spiral servo reference tracks.

3. The method of claim 2, wherein the multiple non-overlapping spiral servo reference tracks comprise at least twice a number of servo spokes to be generated.

4. The method of claim 1, wherein obtaining timing information comprises determining a peak position of a diamond-shaped waveform generated by reading the spiral servo reference track in a circle, a read head intersecting the spiral servo reference track at an angle.

5. The method of claim 1, wherein the spiral servo reference track comprises an encoded repeating pattern including a timing-reference symbol, and said obtaining the timing information comprises identifying occurrences of the timing-reference symbol in the spiral servo reference track.

6. The method of claim 5, wherein said identifying occurrences of the timing-reference symbol in the spiral servo reference track comprises:
   decoding the encoded repeating pattern using multiple framings of signal samples of the signal from the spiral servo reference track on the machine-readable medium;
   correlating the signal samples that indicate pattern transitions, for the multiple framings, with valid pattern transitions as defined by the encoding;
   accumulating the transition pattern correlations for the multiple framings;
   selecting one of the multiple framings as a correct framing for decoding based on the accumulated correlations; and
   the determining comprising determining the waveform polarity for the signal based on the repeating pattern and the selected correct framing.

7. The method of claim 6, wherein said decoding the encoded repeating pattern using multiple framings comprises performing Viterbi detection, using a correlation metric, with the multiple framings.

8. The method of claim 6, wherein the encoded repeating pattern comprises a 1/N rate coding of a repeating pattern of multiple filler symbols followed by the timing-reference symbol, resulting in a channel bit rate of N relative to a symbol rate, and said decoding the encoded repeating pattern comprises using N different framings of the signal samples, the method further comprising sampling the signal at the channel bit rate.

9. The method of claim 6, wherein said correlating the signal samples that indicate pattern transitions comprises correlating the signal samples that indicate transitions from a filler symbol to the timing-reference symbol with expected signal samples for transitions from the filler symbol to the timing-reference symbol.

10. The method of claim 9, wherein said correlating the signal samples that indicate pattern transitions further comprises correlating the signal samples that indicate transitions from the timing-reference symbol to the filler symbol with expected signal samples for transitions from the timing-reference symbol to the filler symbol.

11. The method of claim 6, wherein said selecting one of the multiple framings as a correct framing comprises selecting one of the multiple framings after a programmable number of transition pattern correlations have been accumulated.

12. The method of claim 6, wherein said accumulating the transition pattern correlations comprises adding up positive correlations, and said selecting one of the multiple framings comprises selecting a framing having a largest associated accumulation of positive correlations.

13. The method of claim 6, wherein said determining the waveform polarity comprises:
   determining a signal-indicated framing based on a generally sinusoidal portion of the signal; and
   identifying a reversed polarity if the signal-indicated framing is different than the correct framing selected based on the accumulated correlations.

14. The method of claim 6, wherein said determining the waveform polarity comprises checking for an inordinate number of timing-reference symbols in the decoded pattern for the selected correct framing.

15. The method of claim 1, wherein said generating the servo track comprises writing the servo information into servo wedges in circular, concentric tracks on the machine-readable medium, overwriting at least a portion of the spiral servo reference track.

16. The method of claim 1, wherein said generating the servo track comprises writing the servo information on another machine-readable medium.

17. A system comprising:
   a servo writer that writes a spiral servo reference track on a machine-readable medium; and
   a storage device that includes the machine-readable medium and generates a servo track with servo information in the storage device based on head position determined using timing information obtained from the spiral servo reference track, wherein the storage device comprises:
   a detector that decodes an encoded repeating pattern including a timing-reference symbol in the spiral servo reference track for multiple framings of the encoded repeating pattern; and framing and polarity monitoring circuitry that indicates one of the multiple framings as a proper framing and indicates reversed polarity based on the encoded repeating pattern.

18. The system of claim 17, wherein the servo writer writes multiple non-overlapping spiral servo reference tracks on the machine-readable medium.

19. The system of claim 18, wherein the multiple non-overlapping spiral servo reference tracks comprise at least twice a number of servo spokes to be generated.

20. The system of claim 17, wherein the storage device determines a peak position of a diamond-shaped waveform generated by reading the spiral servo reference track in a circle.

21. The system of claim 17, wherein the encoded repeating pattern comprises a 1/N rate coding of a repeating pattern of multiple filler symbols followed by the timing-reference symbol, resulting in a channel bit rate of N relative to a symbol rate, and the detector decodes the encoded repeating pattern using N different framings of signal samples.

22. The system of claim 17, wherein the framing and polarity monitoring circuitry comprises output pattern correlation accumulators that retain measures of correlation between sampled output and expected output for pattern transitions in the encoded repeating pattern for the multiple framings.

23. The system of claim 22, wherein the framing and polarity monitoring circuitry indicates one of the multiple framings as a proper framing after a programmable number of transition pattern correlations have been accumulated.

24. The system of claim 17, wherein the framing and polarity monitoring circuitry identifies reversed polarity by checking for an inordinate number of timing-reference symbols in the decoded pattern.

25. The system of claim 17, wherein the framing and polarity monitoring circuitry identifies reversed polarity by checking if a signal-indicated framing is different than a pattern-transition-correlation indicated framing.

26. The system of claim 17, wherein the detector comprises a Viterbi detector including a branch metric generator that produces branch metrics comprising a correlation of the encoded repeating pattern and corresponding estimated data generated according to the encoding.

27. The system of claim 17, wherein the storage device comprises multiple magnetic-based storage disks, one of the magnetic-based storage disks comprising the machine-readable medium.

28. A storage device comprising:
a machine-readable medium including a spiral servo reference track; and
a servo track generator that obtains timing information from the spiral servo reference track on the machine-readable medium and writes a servo track with servo information based on the obtained timing information, wherein the servo track generator comprises:
a detector that decodes an encoded repeating pattern including a timing-reference symbol in the spiral servo reference track for multiple framings of the encoded repeating pattern; and
framing and polarity monitoring circuitry that indicates one of the multiple framings as a proper framing and indicates reversed polarity based on the encoded repeating pattern.

29. The device of claim 28, wherein the machine-readable medium includes multiple non-overlapping spiral servo reference tracks.

30. The device of claim 29, wherein the multiple non-overlapping spiral servo reference tracks comprise at least twice a number of servo spokes to be generated.

31. The device of claim 28, wherein the servo track generator determines a peak position of a diamond-shaped waveform generated by reading the spiral servo reference track in a circle.

32. The device of claim 28, wherein the encoded repeating pattern comprises a 1/N rate coding of a repeating pattern of multiple filler symbols followed by the timing-reference symbol, resulting in a channel bit rate of N relative to a symbol rate, and the detector decodes the encoded repeating pattern using N different framings of signal samples.

33. The device of claim 28, wherein the framing and polarity monitoring circuitry comprises output pattern correlation accumulators that retain measures of correlation between sampled output and expected output for pattern transitions in the encoded repeating pattern for the multiple framings.

34. The device of claim 33, wherein the framing and polarity monitoring circuitry indicates one of the multiple framings as a proper framing after a programmable number of transition pattern correlations have been accumulated.

35. The device of claim 28, wherein the framing and polarity monitoring circuitry identifies reversed polarity by checking for an inordinate number of timing-reference symbols in the decoded pattern.

36. The device of claim 28, wherein the framing and polarity monitoring circuitry identifies reversed polarity by checking if a signal-indicated framing is different than a pattern-transition-correlation indicated framing.

37. The device of claim 28, wherein the detector comprises a Viterbi detector including a branch metric generator that produces branch metrics comprising a correlation of the encoded repeating pattern and corresponding estimated data generated according to the encoding.

38. The device of claim 37, wherein the encoding comprises a Manchester code.

39. The device of claim 28, wherein the machine-readable medium comprises multiple magnetic-based storage disks, and the servo track generator writes multiple servo tracks on the multiple disks based on the obtained timing information.

40. A system comprising:
means for writing a spiral servo reference track on a machine-readable medium; and
means for generating a servo track with servo information based on timing information obtained from the spiral servo reference track on the machine-readable medium;
wherein said means for generating the servo track comprises means for determining a waveform polarity of a signal from the spiral servo reference track on the machine-readable medium.

41. The system of claim 40, wherein said means for generating the servo track comprises:
means for decoding an encoded repeating pattern using multiple framings of signal samples of the signal from the spiral servo reference track on the machine-readable medium;
means for correlating the signal samples that indicate pattern transitions, for the multiple framings, with valid pattern transitions as defined by the encoding;
means for accumulating the transition pattern correlations for the multiple framings;
means for selecting one of the multiple framings as a correct framing for decoding based on the accumulated correlations; and the means for determining comprises means for determining the waveform polarity for the signal based on the repeating pattern and the selected correct framing.

42. The system of claim 41, wherein said means for decoding comprises Viterbi means for detecting the encoded repeating pattern, using a correlation metric, with the multiple framings.

43. The system of claim 41, wherein the encoded repeating pattern comprises a 1/N rate coding of a repeating pattern of multiple filler symbols followed by a timing-reference symbol, resulting in a channel bit rate of N relative to a symbol rate, and said means for decoding comprises means for using N different framings of the signal samples.

44. The system of claim 41, wherein said means for correlating the signal samples that indicate pattern transitions comprises means for correlating the signal samples that indicate transitions from a filler symbol to a timing-reference symbol with expected signal samples for transitions from the filler symbol to the timing-reference symbol, and correlating the signal samples that indicate transitions from the timing-reference symbol to the filler symbol with expected signal samples for transitions from the timing-reference symbol to the filler symbol.

45. The system of claim 41, wherein said means for selecting one of the multiple framings as a correct framing comprises programmable means for selecting one of the multiple framings.

46. The system of claim 41, wherein said means for determining the waveform polarity comprises:
 means for determining a signal-indicated framing based on a generally sinusoidal portion of the signal; and
 means for identifying a reversed polarity if the signal-indicated framing is different than the correct framing selected based on the accumulated correlations.

* * * * *